United States Patent
Kim et al.

(10) Patent No.: US 9,498,943 B2
(45) Date of Patent: Nov. 22, 2016

(54) SYSTEM FOR LAMINATING OPTICAL FILM AND METHOD FOR MANUFACTURING DISPLAY UNIT USING THE SAME

(71) Applicant: LG Chem, Ltd., Seoul (KR)

(72) Inventors: Kyoung-Sik Kim, Daejeon (KR);
Eung-Jin Jang, Daejeon (KR);
Suk-Jae Lee, Daejeon (KR);
Kyoung-Ho Cho, Daejeon (KR);
Cheon-Ho Park, Daejeon (KR);
Won-Cheul Ju, Daejeon (KR);
Beom-Seok Lee, Daejeon (KR);
Jea-Han Ryoo, Daejeon (KR)

(73) Assignee: LG Chem, Ltd., Seoul (KR)

(*) Notice: Subject to any disclaimer, the term of this patent is extended or adjusted under 35 U.S.C. 154(b) by 199 days.

(21) Appl. No.: 14/536,988

(22) Filed: Nov. 10, 2014

(65) Prior Publication Data
US 2015/0190996 A1 Jul. 9, 2015

Related U.S. Application Data

(63) Continuation of application No. PCT/KR2014/003611, filed on Apr. 24, 2014.

(30) Foreign Application Priority Data

Jan. 8, 2014 (KR) .................. 10-2014-0002582
Feb. 17, 2014 (KR) .................. 10-2014-0018125

(51) Int. Cl.
*G02F 1/01* (2006.01)
*B32B 38/18* (2006.01)
(Continued)

(52) U.S. Cl.
CPC ............. *B32B 37/22* (2013.01); *B32B 37/02* (2013.01); *G02F 1/1303* (2013.01); *G02F 1/133528* (2013.01); *B29D 11/0073* (2013.01); *B32B 37/0046* (2013.01); *B32B 37/223* (2013.01); *B32B 38/0004* (2013.01); *B32B 38/1858* (2013.01); *B32B 2307/42* (2013.01); *B32B 2457/20* (2013.01); *B32B 2457/202* (2013.01);
(Continued)

(58) Field of Classification Search
CPC .......... G02F 1/1303; G02F 1/133305; G02F 1/133528; B32B 2457/202; B32B 2307/42; B32B 38/1858; B29D 11/0073; B65H 20/12; B65H 2404/1362; B65H 2404/1363; B65H 2406/33
See application file for complete search history.

(56) References Cited

U.S. PATENT DOCUMENTS

| | | |
|---|---|---|
| 2005/0016670 A1 | 1/2005 | Kanbara et al. |
| 2009/0218049 A1 | 9/2009 | Kanbara et al. |

(Continued)

FOREIGN PATENT DOCUMENTS

| | | |
|---|---|---|
| CN | 1470890 A | 1/2004 |
| CN | 1737649 A | 2/2006 |

(Continued)

*Primary Examiner* — Carson Gross
(74) *Attorney, Agent, or Firm* — Dentons US LLP (57) ABSTRACT

A system for laminating an optical film according to an exemplary embodiment of the present disclosure includes a panel transfer unit to transfer a panel, a first laminating unit installed on a transfer line of the panel to laminate an optical film on a first surface of the panel along a first direction parallel to a transfer direction of the panel, and a second laminating unit installed on the transfer line of the panel to laminate an optical film on a second surface of the panel, wherein the second laminating unit includes a laminating drum to laminate an optical film after adsorbing and rotating the optical film in a horizontal direction.

23 Claims, 10 Drawing Sheets

(51) Int. Cl.
*B32B 37/22* (2006.01)
*G02F 1/13* (2006.01)
*G02F 1/1335* (2006.01)
*B32B 37/02* (2006.01)
*B32B 38/00* (2006.01)
*B32B 37/00* (2006.01)
*B29D 11/00* (2006.01)

(52) U.S. Cl.
CPC .......... *B65H 2406/33* (2013.01); *Y10T 156/10* (2015.01); *Y10T 156/1322* (2015.01); *Y10T 156/17* (2015.01); *Y10T 156/1734* (2015.01)

(56) References Cited

U.S. PATENT DOCUMENTS

| | | | | |
|---|---|---|---|---|
| 2010/0186890 | A1* | 7/2010 | Kitada | B32B 38/185 156/256 |
| 2010/0206485 | A1* | 8/2010 | Kodera | B29C 63/024 156/358 |
| 2010/0288432 | A1* | 11/2010 | Kitada | B32B 38/0004 156/248 |
| 2011/0126988 | A1 | 6/2011 | Kitada et al. | |
| 2012/0071057 | A1* | 3/2012 | Hirata | B29D 11/0073 445/24 |
| 2013/0037205 | A1* | 2/2013 | Hirata | B32B 37/02 156/247 |

FOREIGN PATENT DOCUMENTS

| | | |
|---|---|---|
| CN | 100365450 C | 1/2008 |
| JP | 2013-83787 A | 5/2013 |
| KR | 10-2004-0002796 A | 1/2004 |
| KR | 10-2009-0110249 A | 10/2009 |
| KR | 10-2010-0088036 A | 8/2010 |
| TW | M356132 U | 5/2009 |
| TW | I373445 B | 10/2012 |

* cited by examiner

SYSTEM FOR LAMINATING OPTICAL FILM AND METHOD FOR MANUFACTURING DISPLAY UNIT USING THE SAME

CROSS-REFERENCE TO RELATED APPLICATION

The present application is a continuation of International Application No. PCT/KR2014/003611 filed on Apr. 24, 2014, which claims priority to Korean Patent Application No. 10-2014-0002582 filed in the Republic of Korea on Jan. 8, 2014 and Korean Patent Application No. 10-2014-0018125 filed in the Republic of Korea on Feb. 17, 2014, the disclosures of which are incorporated herein by reference.

TECHNICAL FIELD

The present disclosure relates to a system for laminating an optical film and a method for manufacturing a display unit using the same, and more particularly, to a system for attaching an optical film that may increase procedural efficiency and efficiency in aspect of spatial utilization in a process of attaching an optical film onto both surfaces of a panel constituting a display device, and a method for manufacturing a display unit using the same.

BACKGROUND ART

Figure 1:
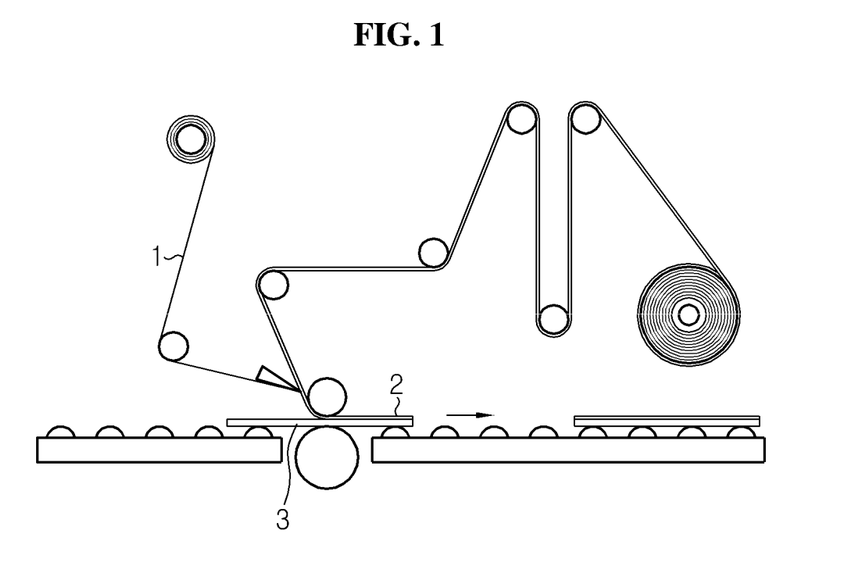
FIG. 1 is a conceptual diagram illustrating a system for laminating an optical film according to a related art.
Figure 2:
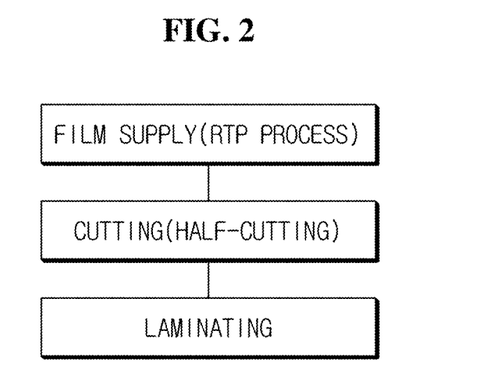
FIG. 2 is a flowchart illustrating a process according to a related art using the system for laminating an optical film shown in FIG. 1.

For use in a display device, a display unit implemented by attaching an optical film such as a polarizing film onto both surfaces of a panel is manufactured by a manufacturing system, and FIG. 1 illustrates conceptually a part of a system for manufacturing a display unit according to a related art, and FIG. 2 illustrates a process of manufacturing a display unit using a manufacturing system.

Referring to FIGS. 1 and 2, a display unit is obtained by providing, to a panel 3, an optical film 2 with a release sheet 1 attached on one surface using a roll, cutting the optical film 2 into a size corresponding to the panel 3, and laminating the optical film 2 on one surface of the panel while removing the release sheet 1 attached to the optical film 2, and subsequently, laminating the optical film 2 on the other surface of the panel 3 through the same process.

However, in the case of the process of manufacturing a display unit according to the related art, a process of reversing the panel 3 is needed, hence efficiency of the process may reduce.

Figure 3:
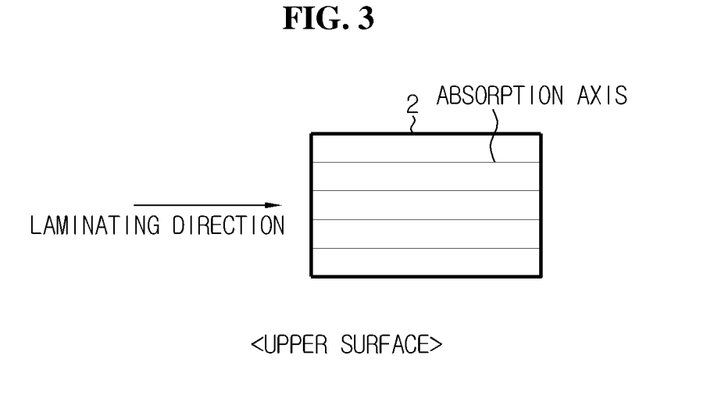
FIGS. 3 and 4 are diagrams illustrating a direction in which absorption axes of a pair of polarizing films each attached onto both sides of a panel shown in FIG. 1 are formed.
Figure 4:
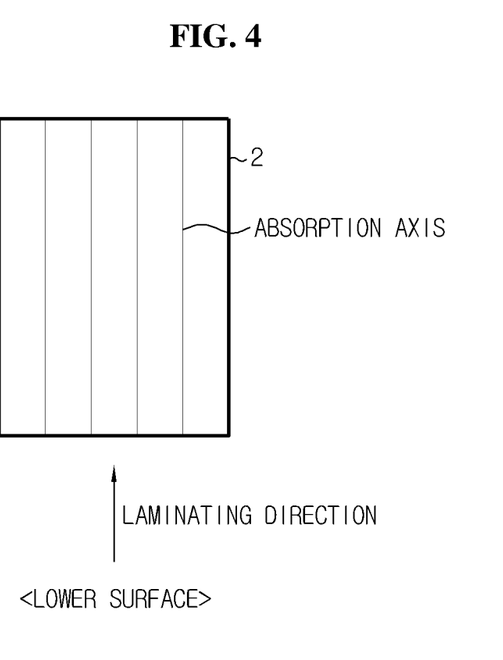

Meanwhile, referring to FIG. 3, in case in which the optical film 2 to be attached to the panel 3 corresponds to a polarizing film, when attaching a polarizing film onto both surfaces of the panel 3, polarizing films should be attached such that absorption axes are perpendicular to each other, and to do so, a process of rotating the panel 3 is also needed.

To perform this additional process, addition of an apparatus for reversing/rotating the panel is required, and the addition of the apparatus results in an increased process line length, causing a reduction in spatial efficiency.

DISCLOSURE

Technical Problem

The present disclosure is designed to solve the above problem, and therefore, the present disclosure is directed to increasing process efficiency in a process of attaching an optical film onto both surfaces of a panel.

However, the object of the present disclosure is not limited to the above object, and other objects of the present disclosure will become apparent to those skilled in the art from the following description.

Technical Solution

To achieve the above object, a system for laminating an optical film according to an exemplary embodiment of the present disclosure includes a panel transfer unit to transfer a panel, a first laminating unit installed on a transfer line of the panel to laminate an optical film on a first surface of the panel along a first direction parallel to a transfer direction of the panel, and a second laminating unit installed on the transfer line of the panel to laminate an optical film on a second surface of the panel, wherein the second laminating unit includes a laminating drum to laminate an optical film after adsorbing and rotating the optical film in a horizontal direction.

The panel transfer unit may include a conveyor belt to support and convey the panel.

The panel transfer unit may include a transfer roller to support and convey the panel.

The panel transfer unit may have a width corresponding to a width of the panel.

The first laminating unit may include a first supply roll to supply the optical film, and a laminating roll to laminate the supplied optical film on the panel.

The first laminating unit may include a release sheet remover disposed between the first supply roll and the laminating roll to separate a release sheet attached to the optical film.

The first laminating unit may include a first collector roll to collect the release sheet separated from the optical film.

The first laminating unit may include a first cutter disposed between the first supply roll and the release sheet remover to half-cut the optical film into a predetermined length.

The first laminating unit may include a first supply roll to supply the optical film, and a laminating drum to laminate the supplied optical film on the panel.

The second laminating unit may include a second supply roll to supply the optical film to the laminating drum.

The second supply roll may supply the optical film along a direction parallel to the first direction.

The second laminating unit may include a film holder disposed opposite to the laminating drum across the optical film to hold the release sheet to allow the release sheet attached to the optical film to be separated.

The second laminating unit may include a second cutter disposed between the second supply roll and the film holder to cut the optical film into a predetermined length.

The laminating drum may separate and adsorb the optical film from the release sheet held by the film holder, and may laminate the optical film on the second surface of the panel.

The laminating drum may have an adsorption hole formed on a periphery.

An adsorption pad may be attached onto the periphery of the laminating drum.

The second laminating unit may include a second collector roll to collect the release sheet separated from the optical film along a direction parallel to the movement direction of the panel.

The laminating drum may rotate at an angle of 90°.

The laminating drum may adsorb the optical film along a direction perpendicular to the first direction, and may laminate the optical film along a direction parallel to the first direction.

Meanwhile, the above object may be also achieved by a method for manufacturing a display unit according to an exemplary embodiment of the present disclosure, and the method for manufacturing a display unit includes (a) supplying a panel for manufacturing a display unit, (b) laminating an optical film on a first surface of the supplied panel along a first direction parallel to a transfer direction of the panel, and (c) adsorbing and rotating an optical film in a horizontal direction, and laminating the optical film on a second surface of the panel.

The step (c) may be performed simultaneously or sequentially with the step (b).

The step (c) may include (c1) supplying the optical film along a direction parallel to the first direction using a supply roll, (c2) adsorbing the optical film using a laminating drum, (c3) rotating the laminating drum in the horizontal direction, and (c4) laminating the optical film adsorbed onto the laminating drum on the second surface of the panel.

The step (c3) may include rotating the laminating drum 90° in the horizontal direction.

Advantageous Effects

According to the present disclosure, in a process of attaching an optical film onto both surfaces of a panel, process efficiency may be increased.

DESCRIPTION OF DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

First, an entire construction of a system for laminating an optical film according to an exemplary embodiment of the present disclosure is described with reference to FIG. 5.

Figure 5:
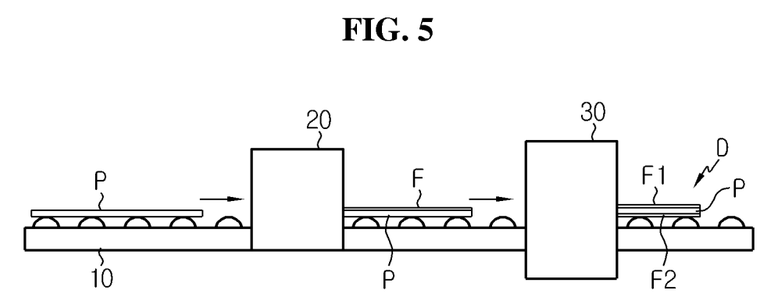
FIG. 5 is a conceptual diagram illustrating a system for laminating an optical film according to an exemplary embodiment of the present disclosure.

FIG. 5 is a conceptual diagram illustrating a system for laminating an optical film according to an exemplary embodiment of the present disclosure.

Referring to FIG. 5, the system for laminating an optical film according to an exemplary embodiment of the present disclosure includes a panel transfer unit 10, a first laminating unit 20, and a second laminating unit 30.

The panel transfer unit 10 transfers, within the system, a panel P to which an optical film F is to be attached, and has a width corresponding to a width of the panel P.

As a means for supporting and conveying the panel P, various transfer means such as a conveyor belt or a transfer roller may be used.

The first laminating unit 20 and the second laminating unit 30 are installed on a transfer line of the panel P to laminate optical films F1 an F2 on a first surface and an opposing second surface of the panel P, respectively.

Specific functions and construction of the first laminating unit 20 and the second laminating unit 30 will be described below in more detail with reference to FIGS. 6 through 10.

First, a laminating direction on the first surface of the panel P and a laminating direction on the second surface are described with reference to FIG. 6.

Figure 6:
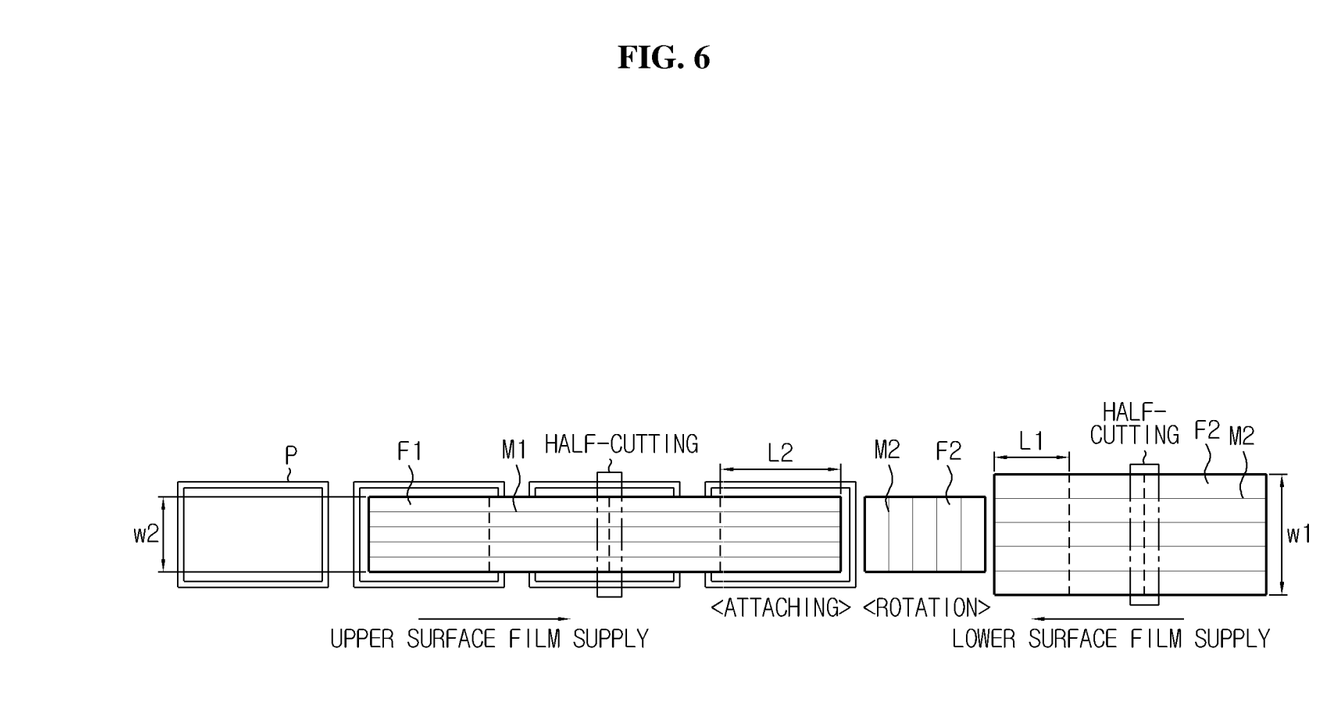
FIG. 6 is a diagram illustrating a laminating direction of an optical film by a first laminating unit and a second laminating unit shown in FIG. 5.

FIG. 6 is a diagram illustrating a laminating direction of an optical film by the first laminating unit and the second laminating unit shown in FIG. 5.

Referring to FIG. 6, the optical film F1 to be laminated on the first surface of the panel P and the optical film F2 to be laminated on the second surface are laminated along directions parallel to each other.

That is, referring to FIGS. 5 and 6 together, the first laminating unit 20 and the second laminating unit 30 laminate the optical films F1 and F2 on the first surface and the second surface of the panel P along a direction parallel to the transfer direction of the panel P.

Also, a width W1 and a length L1 of the optical film F2 to be attached onto the second surface of the panel P are respectively equal to a length L2 and a width W2 of the optical film F1 to be attached onto the first surface of the panel P.

That is, the second laminating unit 30 supplies the optical film F2 having the width W1 equal to the unit length L2 of the optical film F1 being attached to the first surface of the panel P, cuts it into the unit length L1, rotates it 90° in the horizontal direction, and attaches it onto the second surface of the panel P. Here, rotating in the horizontal direction represents rotating around an axis perpendicular to the panel P, and hereinafter will be applied as the same meaning.

As described above, rotating the optical film F2 to be laminated on the second surface of the panel P is for allowing absorption axes M1 and M2 of the optical films F1 and F2 to form a right angle, particularly, in case in which the optical films F1 and F2 correspond to a polarizing film.

Subsequently, a structure of the first laminating unit 20 is described in more detail with reference to FIG. 7.

Figure 7:
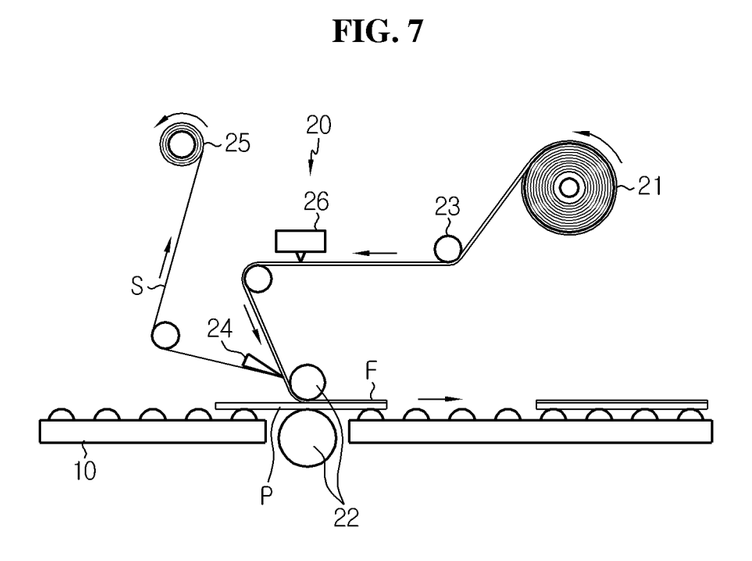
FIG. 7 is a diagram illustrating an example of implementation of a first laminating unit shown in FIG. 5.

FIG. 7 is a diagram illustrating an example of implementation of the first laminating unit shown in FIG. 5.

Referring to FIG. 7, the first laminating unit 20 may be implemented to include a first supply roll 21, on which the optical film F with the release sheet S attached onto one surface is wound, to supply the optical film F, and a pair of laminating rolls 22 to laminate the optical film F separated from the release sheet S on the first surface of the panel P along the transfer direction of the panel P.

The laminating roll 22 may include a first roll disposed on the first surface of the panel P being transferred and a second roll disposed on the second surface.

Also, the first laminating unit 20 may further include at least one tension roll 23 to maintain tension of the optical film F between the first supply roll 21 and the laminating roll 22.

Meanwhile, the first laminating unit 20 may include a release sheet remover 24 disposed between the first supply roll 21 and the laminating roll 22 to separate the release sheet S attached to the optical film F, and in this case, may further include a collector roll 25 to collect the separated release sheet S.

Additionally, the first laminating unit 20 may further include a first cutter 26 disposed between the first supply roll 21 and the release sheet remover to half-cut the optical film F into a predetermined length.

Here, half-cutting represents cutting only the optical film F while leaving the release sheet S intact, when tailoring the optical film F with the attached release sheet S into a predetermined length, and hereinafter is equally applied. Half-cutting allows for continuous supply and laminating of the optical film F using a roll.

Meanwhile, although FIG. 7 of the present disclosure only shows that the optical film F is laminated on the panel P while passing through between the pair of laminating rolls 22, the present disclosure is not limited thereto.

That is, a method of laminating the optical film F on the first surface of the panel P is enough if continuous laminating is enabled by a roll to panel (RTP) technology, and thus, other laminating means such as, for example, a laminating drum (see FIG. 8) to be described later may be used in place of the laminating roll 22.

Subsequently, a structure of the second laminating unit 30 is described in more detail with reference to FIGS. 8 through 10.

Figure 8:
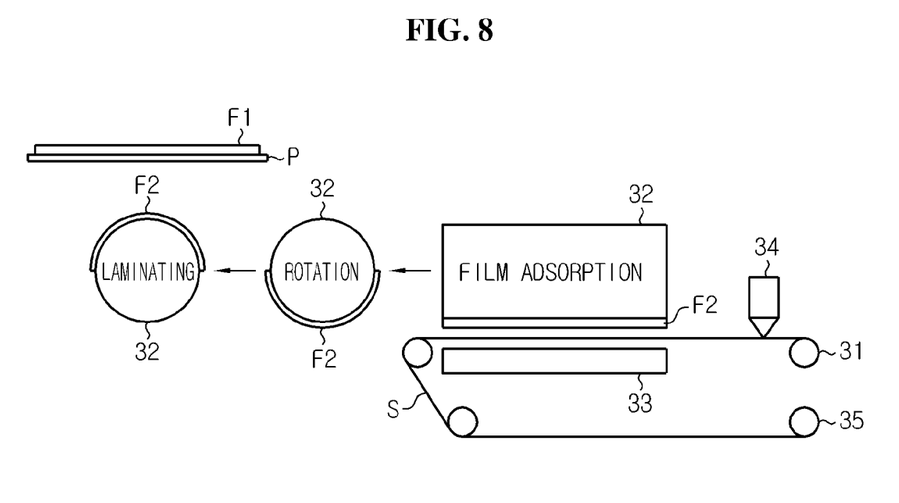
FIG. 8 is a diagram illustrating an example of implementation of a second laminating unit shown in FIG. 5.
Figure 9:
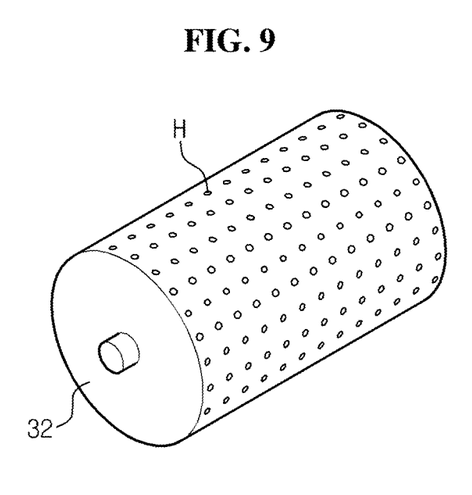
FIG. 9 is a diagram illustrating an example of implementation of a laminating drum shown in FIG. 8.
Figure 10:
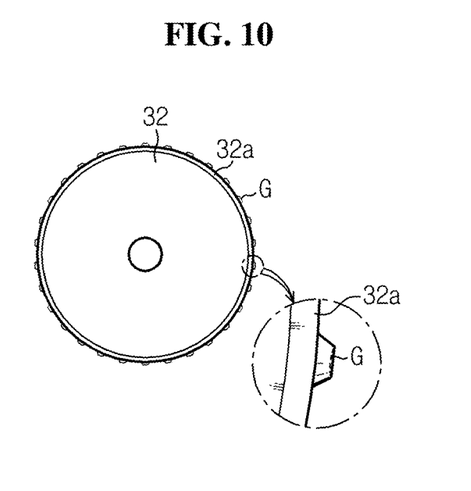
FIG. 10 is a diagram illustrating another example of implementation of a laminating drum shown in FIG. 8.

FIG. 8 is a diagram illustrating an example of implementation of the second laminating unit shown in FIG. 5, FIG. 9 is a diagram illustrating an example of implementation of a laminating drum shown in FIG. 8, and FIG. 10 is a diagram illustrating another example of implementation of a laminating drum shown in FIG. 8.

First, referring to FIG. 8, the second laminating unit 30 may be implemented to include a second supply roll 31, a laminating drum 32, a film holder 33, a second cutter 34, and a second collector roll 35.

The second supply roll 31, on which the optical film F2 having the release sheet S attached onto one surface is wound, supplies the optical film F2 along a direction parallel to a movement direction of the panel P.

The laminating drum 32 adsorbs the optical film F2 supplied by the second supply roll 31, rotates it 90° in the horizontal direction, and laminates it on the second surface of the panel P.

That is, referring to FIG. 8 along with FIG. 6, the laminating drum 32 adsorbs the optical film F2 cut into the unit length L1 in a direction approximately perpendicular to the movement direction of the panel P, rotates it approximately 90° in the horizontal direction, and performs laminating in a state that absorption axes M1 and M2 are perpendicular to each other The laminating drum 32 has an approximately cylindrical shape, and peels off/adsorbs the optical film F from the release sheet S and laminates the optical film F on the second surface of the panel P while moving between the panel P and the optical film F.

Meanwhile, the laminating drum 32 may have various adsorption structures for adsorbing the optical film F on the periphery thereof, and an example of the adsorption structure is illustrated in FIGS. 9 and 10.

First, referring to FIG. 9, the laminating drum 32 may have a plurality of adsorption holes H formed on the periphery. In this case, an inner space of the laminating drum 32 may be connected to a vacuum pump (not shown), and as the vacuum pump operates, the optical film F may be adsorbed onto the periphery of the laminating drum 32.

Subsequently, referring to FIG. 10, an adsorption pad 32a having a plurality of adsorption grooves G may be attached onto the periphery of the laminating drum 32.

As described above, with the surface structure capable of adsorbing the optical film F, the first laminating drum 32 adsorbs the optical film F separated from the release sheet S onto the periphery along a direction perpendicular to the movement direction of the panel P, rotates it 90° in the horizontal direction, and then laminates the optical film F on the panel P along a direction parallel to the movement direction of the panel P.

In this instance, adhesion between the panel P and the optical film F is achieved by an adhesive layer formed on a surface where the release sheet S has been attached among both surfaces of the optical film F.

Referring back to FIG. 8, the film holder 33 is disposed opposite to the laminating drum 32 across the optical film F, and serves to hold the release sheet S to allow the release sheet S attached to the optical film F to be separated.

The film holder 33 is not limited to a specific structure as long as it has a structure capable of holding the release sheet S to allow the release sheet S to be separated from the optical film F when the laminating drum 32 adsorbs the optical film F and moves toward the panel P, and for example, the adsorption structure of the laminating drum 32 shown in FIG. 9 may be applied.

The second cutter 34 is disposed between the second supply roll 31 and the film holder 33, and cuts (half-cuts) only the optical film F into the predetermined length L1 (see FIG. 6) while leaving the release sheet S intact, to allow the optical film F to be continuously attached to the panel P.

The second collector roll 35 collects the release sheet S separated from the optical film F along a direction parallel to the movement direction of the panel P.

Meanwhile, although the drawing (particularly, FIG. 6) of the present disclosure only shows that laminating on the first surface of the panel P and laminating on the second surface are performed at different points in time and that laminating on the first surface is performed before laminating on the second surface, the present disclosure is not limited thereto.

That is, laminating on the first surface and laminating on the second surface may be simultaneously performed, and laminating on the second surface may be performed before laminating on the first surface.

As described above, in the manufacture of the display unit D by laminating the optical film on both surfaces of the panel, the system for laminating an optical film according to the present disclosure is constructed to allow not only the laminating direction on the first surface and the laminating direction on the second surface but also the supply direction of the optical film F1 for laminating on the first surface and the supply direction of the optical film F2 for laminating on the second surface to be parallel to each other.

Accordingly, the system for laminating an optical film according to the present disclosure may maximize spatial efficiency by minimizing a width occupied by equipment Also, the system for laminating an optical film according to the present disclosure is constructed to enable the laminating drum 32 to laminate the optical film F2 after adsorbing and rotating the optical film F2 90°, so a separate process of rotating and/or reversing a panel or an optical film is not required to allow absorption axes of optical films being attached to both surfaces of the panel to be perpendicular to each other.

Hereinabove, the present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

What is claimed is:

1. A system for laminating an optical film, comprising:
a panel transfer unit to transfer a panel;
a first laminating unit installed on a transfer line of the panel to laminate a first optical film on a first surface of the panel along a first direction parallel to a transfer direction of the panel; and
a second laminating unit installed on the transfer line of the panel to laminate a second optical film on a second surface of the panel, wherein the second laminating unit comprises a laminating drum to laminate the second optical film after adsorbing and rotating the second optical film in a horizontal direction.

2. The system for laminating an optical film according to claim 1, wherein the panel transfer unit includes a conveyor belt to support and convey the panel.

3. The system for laminating an optical film according to claim 1, wherein the panel transfer unit includes a transfer roller to support and convey the panel.

4. The system for laminating an optical film according to claim 1, wherein the panel transfer unit has a width corresponding to a width of the panel.

5. The system for laminating an optical film according to claim 1, wherein the first laminating unit comprises:
a first supply roll to supply the first optical film; and
a laminating roll to laminate the supplied first optical film on the panel.

6. The system for laminating an optical film according to claim 5, wherein the first laminating unit comprises a release sheet remover disposed between the first supply roll and the laminating roll to separate a release sheet attached to the first optical film.

7. The system for laminating an optical film according to claim 6, wherein the first laminating unit comprises a first collector roll to collect the release sheet separated from the optical film.

8. The system for laminating an optical film according to claim 6, wherein the first laminating unit comprises a first cutter disposed between the first supply roll and the release sheet remover to half-cut the first optical film into a predetermined length.

9. The system for laminating an optical film according to claim 1, wherein the first laminating unit comprises:
a first supply roll to supply the first optical film; and
a laminating drum to laminate the supplied first optical film on the panel.

10. The system for laminating an optical film according to claim 1, wherein the second laminating unit comprises a second supply roll to supply the second optical film to the laminating drum.

11. The system for laminating an optical film according to claim 10, wherein the second supply roll supplies the second optical film along a direction parallel to the first direction.

12. The system for laminating an optical film according to claim 10, wherein the second laminating unit comprises a film holder disposed opposite to the laminating drum across the second optical film to hold a release sheet attached to the second optical film to allow the release sheet attached to the second optical film to be separated.

13. The system for laminating an optical film according to claim 12, wherein the second laminating unit comprises a second cutter disposed between the second supply roll and the film holder to cut the second optical film into a predetermined length.

14. The system for laminating an optical film according to claim 12, wherein the laminating drum separates and adsorbs the second optical film from the release sheet held by the film holder, and laminates the second optical film on the second surface of the panel.

15. The system for laminating an optical film according to claim 1, wherein the laminating drum has an adsorption hole formed on a periphery.

16. The system for laminating an optical film according to claim 1, wherein an adsorption pad is attached onto the periphery of the laminating drum.

17. The system for laminating an optical film according to claim 12, wherein the second laminating unit comprises a second collector roll to collect the release sheet separated from the second optical film along a direction parallel to the transfer direction of the panel.

18. The system for laminating an optical film according to claim 1, wherein the laminating drum rotates at an angle of 90°.

19. The system for laminating an optical film according to claim 1, wherein the laminating drum adsorbs the second optical film along a direction perpendicular to the first direction, and laminates the second optical film along a direction parallel to the first direction.

20. A method for manufacturing a display unit, comprising:
(a) supplying a panel for manufacturing a display unit;
(b) laminating a first optical film on a first surface of the supplied panel along a first direction parallel to a transfer direction of the panel; and
(c) adsorbing and rotating a second optical film in a horizontal direction, and laminating the second optical film on a second surface of the panel.

21. The method for manufacturing a display unit according to claim 20, wherein the step (c) is performed simultaneously or sequentially with the step (b).

22. The method for manufacturing a display unit according to claim 20, wherein the step (c) comprises:
(c1) supplying the second optical film along a direction parallel to the first direction using a supply roll;

(c2) adsorbing the second optical film using a lamination drum;
(c3) rotating the laminating drum in the horizontal direction; and
(c4) laminating the second optical film adsorbed onto the laminating drum on the second surface of the panel.

23. The method for manufacturing a display unit according to claim 22, wherein the step (c3) comprises rotating the laminating drum 90° in the horizontal direction.

* * * * *